United States Patent
Austin et al.

(10) Patent No.: US 8,131,734 B2
(45) Date of Patent: Mar. 6, 2012

(54) IMAGE BASED ANNOTATION AND METADATA GENERATION SYSTEM WITH EXPERIENCE BASED LEARNING

(75) Inventors: Paul R. Austin, Webster, NY (US); Dale E. Gaucas, Penfield, NY (US); Robert R. Buckley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 596 days.

(21) Appl. No.: 12/248,064

(22) Filed: Oct. 9, 2008

(65) Prior Publication Data

US 2010/0095194 A1    Apr. 15, 2010

(51) Int. Cl.
*G06F 7/00* (2006.01)
(52) U.S. Cl. ........................................................ 707/749
(58) Field of Classification Search ............ 707/999.103, 707/749
See application file for complete search history.

(56) References Cited

U.S. PATENT DOCUMENTS

| | | | |
|---|---|---|---|
| 7,028,253 B1 * | 4/2006 | Lieberman et al. | 715/232 |
| 7,395,500 B2 | 7/2008 | Whittle et al. | |
| 2006/0080306 A1 * | 4/2006 | Land et al. | 707/3 |
| 2006/0112067 A1 * | 5/2006 | Morris | 707/1 |
| 2008/0034329 A1 * | 2/2008 | Posner et al. | 715/856 |
| 2008/0154931 A1 * | 6/2008 | Jacobs et al. | 707/101 |

* cited by examiner

*Primary Examiner* — Jensen Hu
(74) *Attorney, Agent, or Firm* — Gibb I.P. Law Firm, LLC

(57) ABSTRACT

Methods and systems enhance a user's experience when working with documents and images. Such methods and systems, provide pictures, graphics, images, etc. related to words, phrases, sentences, etc. when a pointing device is hovered over the word or phrase to help the user to understand and remember the words, phrases, sentences, etc. being read, and/or increase the enjoyment of the user.

16 Claims, 4 Drawing Sheets

IMAGE BASED ANNOTATION AND METADATA GENERATION SYSTEM WITH EXPERIENCE BASED LEARNING

BACKGROUND AND SUMMARY

Embodiments herein generally relate to methods and systems of enhancing the user's experience when working with documents and images and, more specifically, provides pictures, graphics, images, etc., related to words, phrases, sentences, etc., when a pointing device is positioned over the word or phrase to help the user to understand and remember the words, phrases, sentences, etc., being read, and/or increase the enjoyment of the user.

Reading a document is often enhanced by relevant information such as pictures and maps that illustrate an unfamiliar place or culture. Therefore, embodiments herein provide systems and methods that, depending upon the location of a graphic user interface pointer, display images from various collections adjacent to or over words in documents (or on web pages). The images can link to collections of images that further illustrate the document. If the user hovers the pointer over words, they are provided pictures associated with such words, and if the user hovers the pointer over pictures, the user is provided article identifiers related to such pictures. Further, the embodiments herein use the references in the documents to augment the metadata associated with the images to further enhance the description of the image. The accumulation of such metadata relationships between textual documents and images further enables additional associations in the future, with a resulting behavior much like learning.

More specifically, presented below is a method of enhancing the user's experience when working with documents and images. In one embodiment, the method monitors at least one input of a graphic user interface to identify the location of the graphical pointer within the display of the graphic user interface. When the graphical pointer is positioned over (e.g., paused over, hovered over, clicked on, etc.) at least one word displayed on the display, the method matches the word to at least one image within an image database. The images within the image database can comprise textual metadata to permit the matching of the word to the matched image.

Similarly, when the graphical pointer is positioned over at least one image displayed on the display, the method matches the displayed image to at least one textual article within an article database. The displayed image can also comprise textual metadata to permit the matching of the displayed image to the textual article.

After performing either (or both) of the above matching processes, the method can then provide output to the user by displaying (and potentially later printing) the matched image on a location of the display proximate to the word, or displaying at least one article identifier (title, summary, etc.) of the matched textual article on a location of the display proximate to the displayed image.

Thus, the embodiments herein provide pictures, graphics, images, video, audio, etc., related to words, phrases, sentences, etc., when a pointing device is positioned over the word or phrase to help the user to understand and remember the words, phrases, sentences, etc. being read, and/or increase the enjoyment of the user. Similarly, the embodiments herein provide titles, summaries, or other identifiers of articles related to pictures, graphics, images, etc. when a pointing device is positioned over the pictures, graphics, images, etc. to help the user to understand and remember the pictures, graphics, images, etc, and/or increase the enjoyment of the user. Thus, if the user hovers the pointer over words they are provided pictures associated with such words, and if the user hovers the pointer over pictures, the user is provided article identifiers related to such pictures.

The matched image and the article identifier each comprise, or are associated with, a hyperlink within the display. The method updates the textual metadata of the matched image and the article metadata upon the user's selection of the hyperlink through the graphic user interface. More specifically, the textual metadata of the matched image and the article metadata are updated according to keywords of the displayed textual article that the pointer is hovered over and/or the keywords of the textual metadata of the image that is hovered over.

The method can also rank the images within the image database and rank the textual articles within the article database based upon the user's selection of the hyperlink through the graphic user interface. With this, the process of matching the word to the matched image can give preferences to higher ranked images. Similarly, the process of matching the displayed image to the textual article can give preferences to higher ranked textual articles based on the ranking of the textual articles within the article database.

The matching of the word and the matching of the displayed image can be further based on items such as categorical relationships between the word and the textual metadata; categorical relationships between the textual article and the textual metadata of the displayed image; and user preferences.

Embodiments herein also include a system that comprises at least one computer storage medium (readable by a computer) storing the database of images. A processor can be operatively connected to the computer storage medium. The processor reads data and executes instructions stored on the computer storage medium. The graphic user interface can also be operatively connected to the processor. The graphic user interface has at least one input and at least one display.

The processor monitors the input of the graphic user interface to identify the location of the graphical pointer within the display of the graphic user interface. As described above, when the graphical pointer is positioned over at least one word displayed on the display, the processor matches the word to at least one image within the database of images. Similarly, when the graphical pointer is positioned over at least one image displayed on the display, the processor matches the displayed image to at least one textual article within an article database. The display outputs (displays) the matched image (or textual article) on a location of the display proximate to the word.

The processor updates the textual metadata of the matched image and the article metadata upon the user's selection of the hyperlink through the graphic user interface. Again, the textual metadata and the article metadata are updated according to keywords of the displayed textual article that the pointer is hovered over and/or the keywords of the textual metadata of the image that is hovered over.

The processor can also rank the images within the image database and rank the textual articles within the article database based upon the user's selection of the hyperlink through the graphic user interface. With this, the processor can give preferences to higher ranked images or higher ranked textual articles based on the rankings within the databases.

Also, the processor can maintain the textual metadata of the images within a relationship table of the image database instead of maintaining the textual metadata within image files of the image database. Similarly, the embodiments herein can maintain the article metadata of the textual article files within a relationship table of the article database instead of maintaining the article metadata within textual article files of the article database.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

While the present method and structure will be described in connection with embodiments thereof, it will be understood that this disclosure is not limited to the disclosed embodiments. To the contrary, this disclosure is intended to cover all alternatives, modifications, and equivalents as may be included within the spirit and scope, as defined by the appended claims.

As mentioned above, reading a document is often enhanced by relevant information such as images that illustrate an unfamiliar place or culture. Current web technology is capable of annotating web page text with hyperlinks. On Yahoo News® (www.yahoo.com; Yahoo!, Inc., Sunnyvale, Calif., USA), for example, hovering over words displays options to obtain more information, often offering a hypertext link to a web search, and sometimes other content such as a travel guide. Also see U.S. Pat. No. 7,395,500 (the complete disclosure of which is incorporated herein by reference) which relates to changing the appearance of electronically presented documents depending upon the position of a hovering pointer within a graphic user interface. These annotations can be based on an index that identifies certain words as places, others as people, etc.

The embodiments herein use a large corpus of images with some metadata describing the image subject, place taken, etc. as a substitute for the index, and thus annotate a document with corresponding images and/or annotate images with references to documents.

Figure 1:
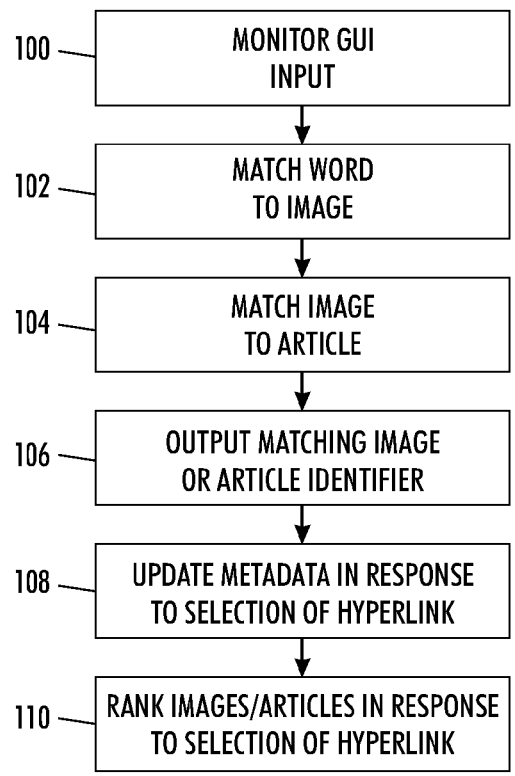
FIG. 1 is a flow diagram illustrating embodiments herein.

As shown in flowchart form in FIG. 1, one exemplary method embodiment herein monitors at least one input of a graphic user interface to identify the location of the graphical pointer within the display of the graphic user interface (item 100). When the graphical pointer is positioned over (e.g., paused over, hovered over, clicked on, etc.) at least one word displayed on the display, the method matches the word to at least one image within an image database in item 102. The images within the image database can comprise textual metadata to permit the matching of the word to the matched image.

Pointing to a user interface object in this manner is sometimes referred to as a mouseover event, mouseover, rollover event, rollover, hover event, or hovering. When a pointer is positioned over a content item description, such as pointer over content item description, and no separate icon or button is displayed for the user to activate, the content item description is typically, but not necessarily, underlined to indicate to the user that the content item description is an actionable user interface object, providing a link to a related content item. An actionable user interface object can be activated by performing another event, such as clicking the pointer on the link represented by the content item description. Activating the text displayed as a content item description invokes the web browser, which sends a request to a web server and receives hypertext markup language (HTML) document that is processed to display the content item/web page.

Similarly, when the graphical pointer is positioned over at least one image displayed on the display, the method matches the displayed image to at least one textual article within an article database in item 104. The displayed image can also comprise textual metadata to permit the matching of the displayed image to the textual article.

After performing either (or both) of the above matching processes, the method can then provide output to the user by automatically displaying (and potentially later printing) the matched image on a location of the display proximate to the word, or displaying at least one article identifier (title, summary, etc.) of the matched textual article on a location of the display proximate to (completely over, partially over, next to, etc.) the displayed image (item 106). The items displayed on the graphic user interface's display can also be printed, if desired, and item 106 also illustrates an optional printing process. By "automatic" it is intended that no activity other than hovering over the word is required to cause the image to be annotated to the currently viewed document.

Thus, the embodiments herein provide pictures, graphics, images, video audio, etc. related to words, phrases, sentences, etc. when a pointing device is positioned over the word or phrase to help the user to understand and remember the words, phrases, sentences, etc. being read, and/or increase the enjoyment of the user. Similarly, the embodiments herein provide titles, summaries, or other identifiers of articles related to pictures, graphics, images, etc. when a pointing device is positioned over the pictures, graphics, images, etc. to help the user to understand and remember the pictures, graphics, images, etc, and/or increase the enjoyment of the user. Thus, if the user hovers the pointer over words they are provided pictures associated with such words, and if the user hovers the pointer over pictures, the user is provided article identifiers related to such pictures.

Further, the embodiments herein evaluate the word or phrase that is hovered over and only perform the matching processes (102, 104) when the word or phrase is maintained within the associated database(s). By limiting the words or phrases that are matched, the embodiments herein avoid confusing the reader (which can occur when too much information is supplied); and also avoid decreasing the performance of the graphic user interface below an acceptable level (which can occur when excessive demands are made upon the graphic user interface).

The matched image and the article identifier each comprise, or are associated with, a hyperlink within the display. Such hyperlinks can point to larger images, collections of similar images, and documents, etc. As shown in item 108, the method can update the textual metadata of the matched image and the article metadata in response to the user's selection of the hyperlink through the graphic user interface. In computing, a hyperlink is a reference or navigation element to another section of the same document or to another document.

Metadata descriptions maintained in image and document files are important for enabling electronic search and retrieval of images; however, entering such metadata is tedious and often is omitted. In a library, where the data is the content of the titles stocked, metadata about a title would typically include a description of the content, the author, the publication date, and the physical location. In the context of an information system, where the data is the content of the computer files, metadata about an individual data item would typically include the name of the field and its length. Metadata about a collection of data items, a computer file, might typically include the name of the file, the type of file and the name of the data administrator.

Even disciplined organizations like museums and libraries include in their metadata only a small fraction of the relevant keywords for an item. Therefore, embodiments herein update the textual metadata and the article metadata according to keywords of the displayed textual article that the pointer is hovered over and/or the keywords of the textual metadata of the image that is hovered over.

A representative image can be used as a hyperlink thumbnail when a word is hovered over, and thus, a link to a collection of images similarly related to the term can be provided. An index of the image metadata is sufficient to enable document annotation. The embodiments herein store a link relating the text and image, which enhances the metadata description of the image by providing text that relates to it. In other words, the present embodiments not only enhance the metadata of the image through statistical user histories; the embodiments herein also track statistical user histories of links from an image to one or more documents to further enhance the metadata of both the image and the documents. Thus, embodiments herein utilize bidirectional relationships between both the images and the documents which relate to such images to improve the quality of the image metadata.

With the new bidirectional relationship thus formed, starting from an image, the embodiments herein can navigate back to documents which refer to the subject of the image and from which the embodiments herein may glean additional context about the image subject from documents. This additional context may be incorporated into the image metadata index, resulting in further annotations of text documents to the image in the future; growth of the relationships between images and documents results in additional future annotations in a manner analogous to learning.

Therefore, in item 108, when the embodiments herein are updating the metadata of the images, this methodology maintains statistics regarding the keywords of the textual article that the user is currently viewing as they select the hyperlink image. Thus, if a user selects a matched image by clicking on the matched image to activate it as a hyperlink, the embodiments herein scan the textual article that the user was currently viewing (and that contained the words that caused the matched image to be annotated to the textual article) to determine if additional potential keywords are maintained within that presently viewed article. For example, such potential keywords may come from surrounding paragraphs or from an explicit keyword meta data field associated with the article.

If a user does not click on an image added to the currently viewed article by the embodiments herein, the image may not be very relevant to the currently viewed article. To the contrary, if the user does click on a matched image that is added to the currently viewed article by the embodiments herein, the selected image may be considered more relevant to the currently viewed article. Therefore, by maintaining statistics regarding the keywords maintained within the currently viewed article when annotated image hyperlinks are activated by the user, the keywords of the metadata of the selected image can be refined by adding more relevant keywords and removing less relevant keywords to and from the metadata.

Many different criteria can be utilized to determine whether keywords are more or less relevant. For example, based upon the statistics of multiple image selections of multiple users from multiple currently viewed articles, if a certain keyword occurs in a high percentage of the currently viewed articles when an image is selected by a user, it could be considered a more relevant keyword and maintained or added to the metadata of a selected image. Similarly, if a certain keyword occurs in a lower percentage of the currently viewed articles when an image is selected by a user, it could be considered a less relevant keyword and removed from the metadata of the selected image.

Therefore, by tracking large volumes of the keywords of currently viewed articles as users make hyperlinks selections of images annotated to documents (according to the position of a graphical pointer) the embodiments herein refine the metadata of the various images. With such refined metadata, more relevant images can be presented increasing the usefulness of such annotation.

In a similar manner, the embodiments herein statistically track the keywords of textual articles corresponding to the selected article identifiers that are annotated to an image as the user hovers the graphical pointer over a given image within a graphic user interface display. Thus, when the embodiments herein provide article identifiers in response to a graphical pointer being hovered over an image, this methodology establishes whether various keywords are more or less relevant to an image based upon the statistical occurrence of keywords within the selected textual articles that are linked to by the article identifiers. Again, the metadata of such an image is therefore refined so that only the most relevant keywords are included and maintained within the metadata for such an image. Similarly, if an image and a textural article are highly statistically correlated by user selections, the metadata from the image can be imported into the metadata of the textual article to refine and supplement the metadata of the textual article.

The embodiments herein can use extraction/data mining techniques to extend the keyword index with additional images using other similar documents referencing an image. The annotated document may be presented with active viewers (e.g. javascript enabled browsers) or formatted for print incorporating the annotations as footnotes or in margins.

This architecture and behavior are well within the capability of conventionally known web technology (e.g., AJAX (Asynchronous JavaScript and XML), JavaScript (Sun Microsystems Inc., Santa Clara, Calif. USA), Google Web Toolkit (Google, Inc. Mountain View, Calif., USA), etc.). The bidirectional nature of the relationship storage provides many advantages related to metadata collection issues.

The method can also rank the images within the image database and rank the textual articles within the article database based upon multiple user's selections of the hyperlink through the graphic user interface, as shown in item 110. With this, the process of matching the word to the matched image 104 can give preferences to higher ranked images. Similarly, the process of matching the displayed image to the textual article 104 can give preferences to higher ranked textual articles based on the ranking of the textual articles within the article database.

Thus, as large collections of such relationships are defined, the embodiments herein incorporate a scoring mechanism to favor the most relevant representative images; mechanisms like reference counting or stochastic methods from natural language processing are suitable for such scoring. Images that contain multiple subjects such as a person at a place could be preferred when there is an ontological relationship in the document relating the subjects, e.g. "Abraham Lincoln speaks at Gettysburg".

The matching of the word and the matching of the displayed image 104 can be further based on items such as categorical relationships between the word and the textual metadata; categorical relationships between the textual article and the textual metadata of the displayed image; and user preferences. Thus, the bidirectional relations may contain one or more identifying names categorizing the relationship to refine the description. Where an uncategorized relationship from a person, place, or thing might be interpreted as thing "appears in" image, an enhanced relationship might be person "spoke at" an event image or train "derailed in" a place image. With categorized relationships, the embodiments herein are able to provide more representative annotation images for a document.

Another further enhancement enabled by the additional categories is a simple model of viewer preferences which may be used to personalize the annotations to be more relevant to the viewer's interests. The simple model can, for example, start with a simple checklist of information categories a viewer is interested in; more advanced models are able to refine the checklist by observation of behaviors in the viewer's navigation.

Figure 2:
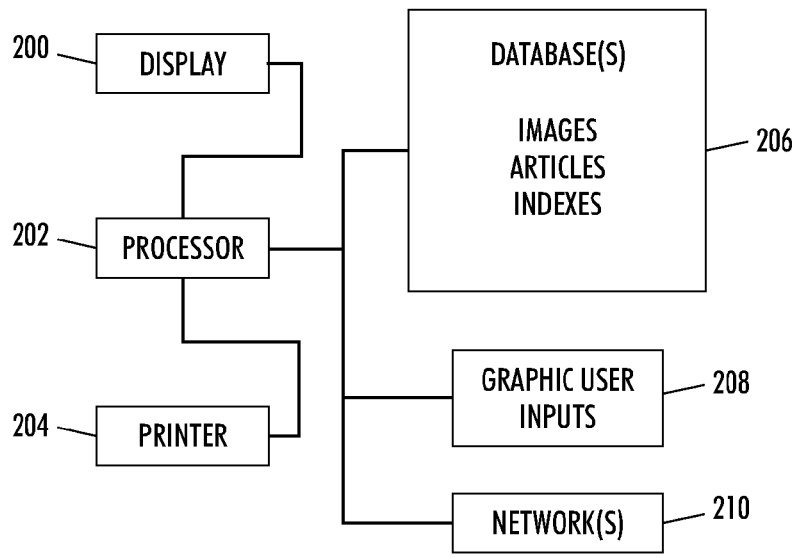
FIG. 2 is a schematic representation of a system according to embodiments herein.

Embodiments herein also include a system that is shown schematically in FIG. 2. This exemplary system comprises at least one computer storage medium 206 (readable by a computer/processor) storing the database of images. The storage medium 206 could comprise any storage medium available on any network, such as the Internet. Thus, the "database" described herein could be partitioned at many places and at many sources of a network, such as the internet. A processor 202 can be operatively connected to the computer storage medium 206. The processor 202 reads data and executes instructions stored the computer storage medium 206 to perform the method embodiments described herein. The graphic user interface can also be operatively connected to the processor 202. The graphic user interface has at least one input 208 such as a mouse, keyboard, trackball, touchpad, etc., and at least one display 200, such as a screen, projector, etc. The system can include a printer 204 and can be connected to one or more networks 210.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock, Tex., USA, and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "image output terminal" as used herein encompasses any apparatus, such as a digital copier, bookmaking machine, facsimile machine, multi-function machine, etc. which performs a print outputting function for any purpose. The embodiments herein can encompass embodiments that print in color, monochrome, or handle color or monochrome image data. All embodiments are specifically applicable to electrostatographic and/or xerographic machines and/or processes.

The processor 202 monitors the input 208 of the graphic user interface to identify the location of the graphical pointer within the display 200 of the graphic user interface. As described above, when the graphical pointer is positioned over at least one word displayed on the display 200, the processor 202 matches the word to at least one image within the database of images. Similarly, when the graphical pointer is positioned over at least one image displayed on the display 200, the processor 202 matches the displayed image to at least one textual article within an article database. The display 200 outputs (displays) the image(or article identifier) on a location of the display 200 proximate to the word (or image).

The processor 202 updates the textual metadata of the matched image and the article metadata upon the user's selection of the hyperlink through the graphic user interface. Again, the textual metadata and the article metadata are updated according to keywords of the displayed textual article that the pointer is hovered over and/or the keywords of the textual metadata of the image that is hovered over.

The processor 202 can also rank the images within the image database and rank the textual articles within the article database based upon the user's selection of the hyperlink through the graphic user interface. With this, the processor 202 can give preferences to higher ranked images or higher ranked textual articles based on the rankings within the databases.

Also, the processor 202 can maintain the textual metadata of the images within a relationship table of the image database 206 instead of maintaining the textual metadata within image files of the image database 206. Similarly, the embodiments herein can maintain the article metadata of the textual article files within a relationship table of the article database instead of maintaining the article metadata within textual article files of the article database.

Thus, it is not required that the bidirectional relationship be stored as additional metadata with, or be incorporated into the images. It may instead be stored as a separate relationship table and accessed by suitable identifiers for either the image or the document words. One possible instantiation of this is as a web service using words and universal resource locators (URLs) as the respective identifiers.

Figure 3:
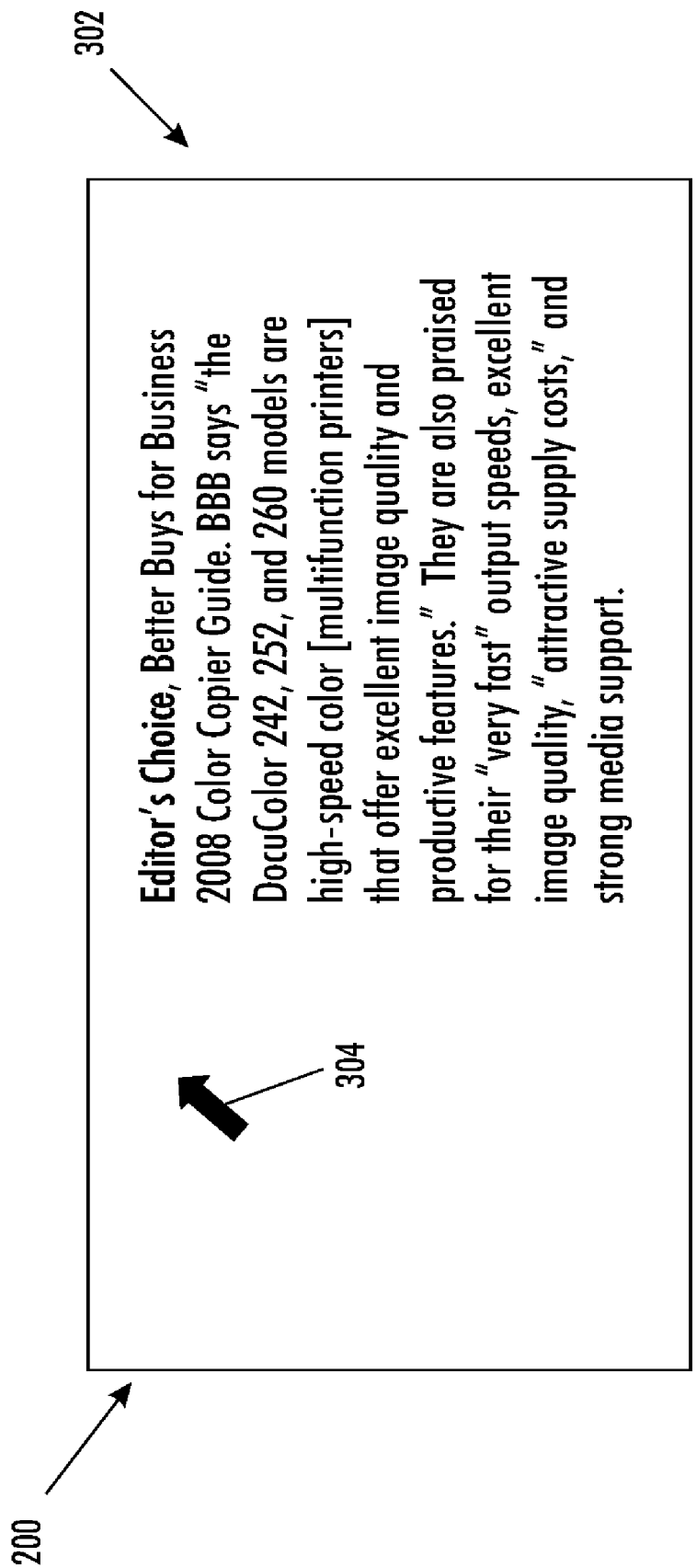
FIG. 3 is a schematic representation of a screenshot according to embodiments herein.
Figure 4:
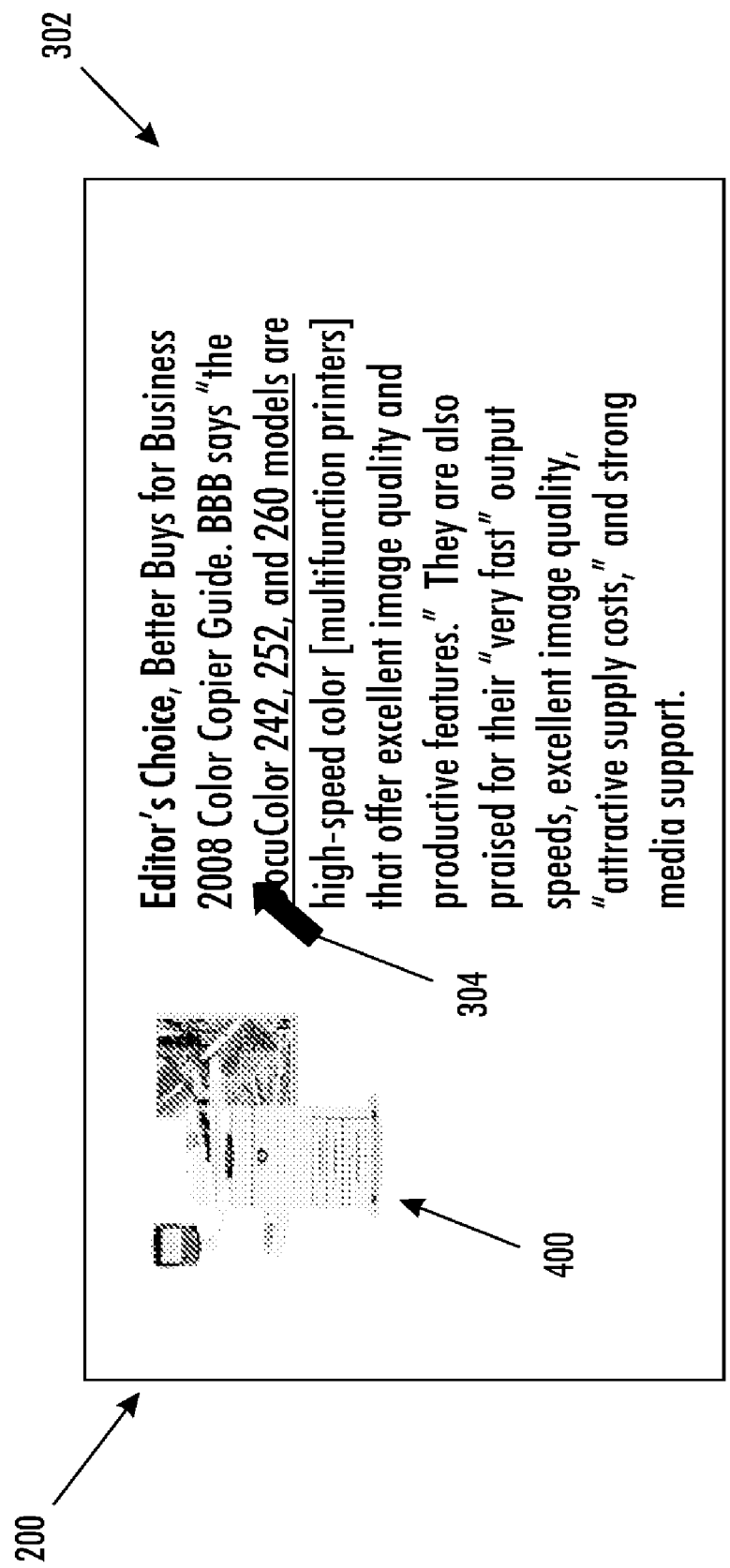
FIG. 4 is a schematic representation of a screenshot according to embodiments herein.
Figure 5:
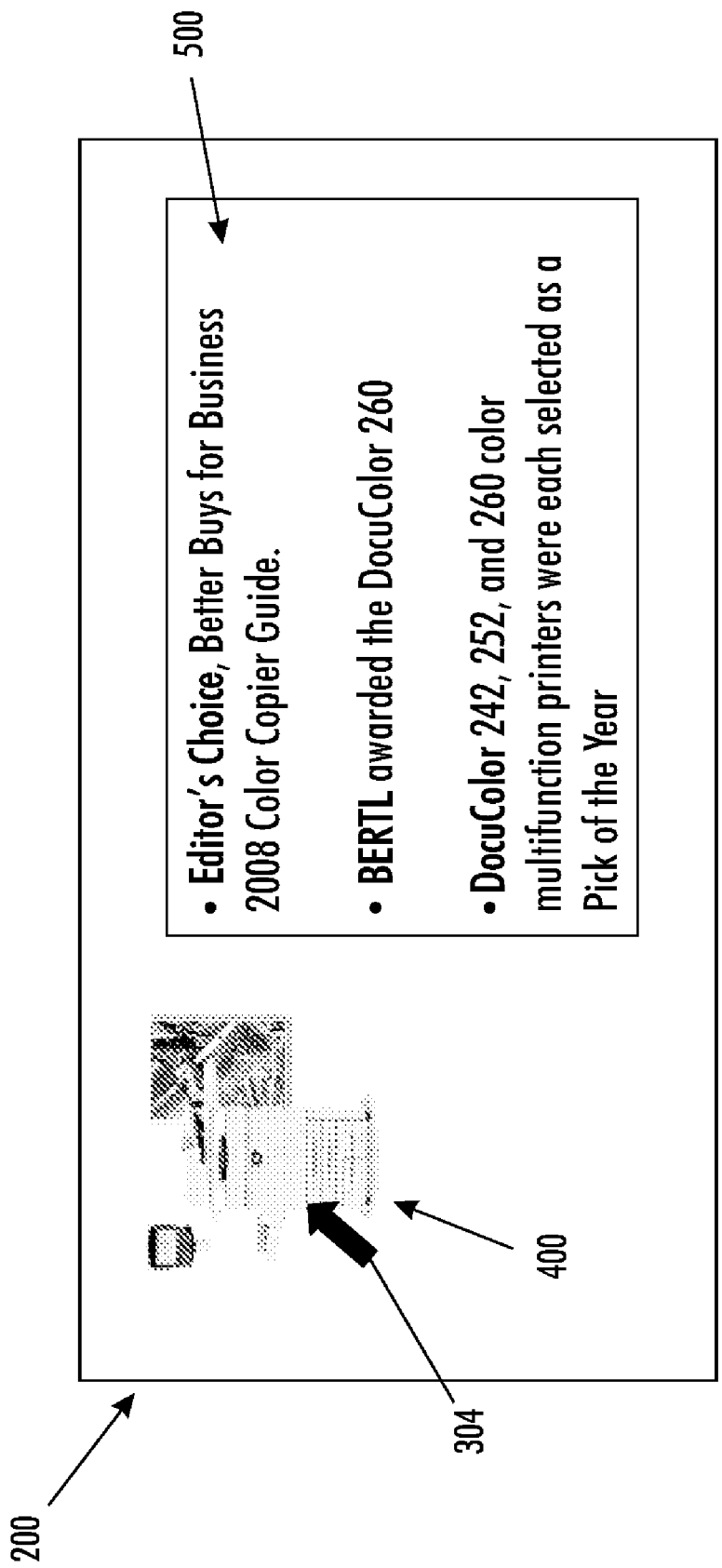
FIG. 5 is a schematic representation of a screenshot according to embodiments herein.

As one example of the operation of the embodiments herein, FIGS. 3-5 illustrate changes in output shown on a graphic user interface display 200 that occur because of the operations of the embodiments herein. More specifically, FIG. 3 illustrates a textural article 302 that appears on a graphic user interface display 200. Item 304 represents a graphical pointer within the graphic user interface display 200.

As shown in FIG. 4, when the graphical pointer 304 is positioned over one or more of the words (such as "Docu-Color") within the textural article 302, a word or group of words can be highlighted, underlined, etc. to indicate that by pausing the movement of the graphical pointer 304, the user is hovering over the word or group of words. As described above, once the graphical pointer 304 hovers over the word or group of words, the embodiments herein automatically display one or more images 400, as shown in FIG. 4. The one or more images 400 can be positioned adjacent to the words or textural article 302, or can be positioned partially over or completely over the words or textural article 302. In addition, the image can be made somewhat transparent so that the image can be observed without completely blocking any underlying words.

As similarly shown in FIG. 5, when the graphical pointer 304 is positioned over an image 400 within a graphic user interface display 200, the embodiments herein can automatically display article identifiers 500 either adjacent to the image 400 or partially or completely over the image 400. As described above, the image or images 400 and the article identifiers 500 can comprise hyperlinks that point to larger images, collections of similar images, and textural articles, etc., and the embodiments herein track the user's actions when they select such hyperlinks to further refine the metadata of the various images and textural articles maintained within the databases 206.

While photographic images 400 are illustrated in FIGS. 4 and 5, the "image" referred to herein can include any graphical item, including photographs, computer-generated graphics, scanned images, maps, illustrations, symbols, etc. Therefore, the embodiments herein are not limited to the photographs shown in FIGS. 4 and 5, but instead are applicable to any form of graphical item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein should not be implied or imported from any above example as limitations to any particular order, number, position, size, shape, angle, color, or material.

What is claimed is:

1. A method comprising:
    monitoring at least one input of a graphic user interface to identify a location of a graphical pointer within at least one display of said graphic user interface;
    when said graphical pointer is positioned over at least one word displayed on said display, matching said word to at least one image within a database of images, said images within said database comprising textual metadata to permit said matching of said word to said image; and
    displaying said at least one image on a location of said display proximate to said word: said image comprising a hyperlink within said display, and said word being a portion of a textual article; and
    updating said textual metadata of said image upon at least one user selection of said hyperlink through said graphic user interface, said updating of said textual metadata of said image being based on keywords of said textual article.

2. The method according to claim 1, said image comprising a hyperlink within said display,
    said method further comprising ranking said images within said database based upon at least one user selection of said hyperlink through said graphic user interface, and
    said matching of said word to said image giving preferences to higher ranked images based on said ranking of said images within said database.

3. The method according to claim 1, further comprising maintaining said textual metadata within a relationship table of said database and not maintaining said textual metadata within image files of said database.

4. The method according to claim 1, wherein said matching is further based on at least one of: categorical relationships between said word and said textual metadata; and user preferences.

5. A method comprising:
    monitoring at least one input of a graphic user interface to identify a location of a graphical pointer within at least one display of said graphic user interface;
    when said graphical pointer is positioned over at least one image displayed on said display, matching said image to at least one textual article within a database of textual articles, said image comprising textual metadata to permit said matching of said image to said textual article;
    displaying at least one article identifier of said at least one textual article on a location of said display proximate to said image, said article identifier comprising a hyperlink within said display, and said textual article comprising article metadata; and
    updating said article metadata of said textual article upon at least one user selection of said hyperlink through said graphic user interface, said updating of said article metadata of said textual article being based on keywords of said textual metadata of said image.

6. The method according to claim 5, said article identifier comprising a hyperlink within said display,
    said method further comprising ranking said textual articles within said database based upon at least one of said hyperlink through said graphic user interface, and
    said matching of said image to said textual article giving preferences to higher ranked textual articles based on said ranking of said textual articles within said database.

7. The method according to claim 5, said textual article comprising article metadata,
    said method further comprising maintaining said article metadata within a relationship table of said database and not maintaining said article metadata within textual article files of said database.

8. The method according to claim 5, wherein said matching is further based on at least one of: categorical relationships between said textual article and said textual metadata of said image; and user preferences.

9. A method comprising:
    monitoring at least one input of a graphic user interface to identify a location of a graphical pointer within at least one display of said graphic user interface;
    when said graphical pointer is positioned over at least one word displayed on said display, matching said word to at least one matched image within an image database of images, said images within said image database comprising textual metadata to permit said matching of said word to said matched image;
    when said graphical pointer is positioned over at least one displayed image displayed on said display, matching said displayed image to at least one textual article within an article database of textual articles, said displayed image comprising textual metadata to permit said matching of said displayed image to said textual article; and
    displaying one of:
        said at least one matched image on a location of said display proximate to said word;
        at least one article identifier of said at least one textual article on a location of said display proximate to said displayed image said matched image and said article identifier each comprising a hyperlink within said display, said word being a portion of a displayed textual article, and said textual article comprising article metadata; and
    updating one of said textual metadata of said matched image and said article metadata upon at least one user selection of said hyperlink through said graphic user interface, said updating of said textual metadata of said matched image being based on keywords of said displayed textual article, and said updating of said article metadata being based on keywords of said textual metadata of said image.

10. The method according to claim 9, said matched image and said article identifier each comprising a hyperlink within said display,
said method further comprising ranking said images within said image database and ranking said textual articles within said article database based upon at least one user selection of said hyperlink through said graphic user interface,
said matching of said word to said matched image giving preferences to higher ranked images based on said ranking of said images within said image database, and
said matching of said displayed image to said textual article giving preferences to higher ranked textual articles based on said ranking of said textual articles within said article database.

11. The method according to claim 9, further comprising:
maintaining said textual metadata within a relationship table of said image database and not maintaining said textual metadata within image files of said image database; and
maintaining said article metadata within a relationship table of said article database and not maintaining said article metadata within textual article files of said article database.

12. The method according to claim 9, wherein said matching of said word and said matching of said displayed image are further based on at least one of: categorical relationships between said word and said textual metadata; categorical relationships between said textual article and said textual metadata of said displayed image; and user preferences.

13. A system comprising:
a computer storage medium readable by a computer storing a database of images;
a processor operatively connected to said computer storage medium, said processor reading data and executing instructions stored said computer storage medium; and
a graphic user interface operatively connected to said processor, said graphic user interface having at least one input and at least one display,
said processor monitoring said input of said graphic user interface to identify a location of a graphical pointer within said display of said graphic user interface;
when said graphical pointer is positioned over at least one word displayed on said display, said processor matches said word to at least one image within said database of images, said images within said database comprising textual metadata to permit said matching of said word to said image;
said display displaying said at least one image on a location of said display proximate to said word, said image comprising a hyperlink within said display, and said word being a portion of a textual article; and
said processor updating said textual metadata of said image upon at least one user selection of said hyperlink through said graphic user interface, said updating of said textual metadata of said image being based on keywords of said textual article.

14. The system according to claim 13, said image comprising a hyperlink within said display,
said processor ranking said images within said database based upon at least one user selection of said hyperlink through said graphic user interface, and
said matching of said word to said image giving preferences to higher ranked images based on said ranking of said images within said database.

15. The system according to claim 13, said processor maintaining said textual metadata within a relationship table of said database and not maintaining said textual metadata within image files of said database.

16. A non-transitory computer storage medium readable by computer and storing instructions executable by said computer to perform a method comprising:
monitoring at least one input of a graphic user interface to identify a location of a graphical pointer within at least one display of said graphic user interface;
when said graphical pointer is positioned over at least one word displayed on said display, matching said word to at least one image within a database of images, said images within said database comprising textual metadata to permit said matching of said word to said image;
displaying said at least one image on a location of said display proximate to said word: said image comprising a hyperlink within said display, and said word being a portion of a textual article; and
updating said textual metadata of said image upon at least one user selection of said hyperlink through said graphic user interface, said updating of said textual metadata of said image being based on keywords of said textual article.

* * * * *